United States Patent
Collberg

(10) Patent No.: US 11,756,303 B2
(45) Date of Patent: Sep. 12, 2023

(54) TRAINING OF AN OBJECT RECOGNITION NEURAL NETWORK

(71) Applicant: Axis AB, Lund (SE)

(72) Inventor: Adam Schill Collberg, Lund (SE)

(73) Assignee: Axis AB, Lund (SE)

( * ) Notice: Subject to any disclaimer, the term of this patent is extended or adjusted under 35 U.S.C. 154(b) by 302 days.

(21) Appl. No.: 17/238,272

(22) Filed: Apr. 23, 2021

(65) Prior Publication Data

US 2021/0406604 A1 Dec. 30, 2021

(30) Foreign Application Priority Data

Jun. 25, 2020 (EP) .................................. 20182135

(51) Int. Cl.
  *G06K 9/00* (2022.01)
  *G06V 20/52* (2022.01)
  (Continued)

(52) U.S. Cl.
  CPC .......... *G06V 20/52* (2022.01); *G06F 18/2148* (2023.01); *G06N 3/04* (2013.01); *G06N 3/08* (2013.01); *G06T 7/20* (2013.01); *G06T 7/70* (2017.01); *G06V 10/255* (2022.01); *G06V 10/454* (2022.01); *G06V 10/82* (2022.01); *G06T 2207/20081* (2013.01); *G06T 2207/20084* (2013.01)

(58) Field of Classification Search
  CPC .................................................... G06V 20/52
  See application file for complete search history.

(56) References Cited

U.S. PATENT DOCUMENTS

2011/0293180 A1* 12/2011 Criminisi ............. H04N 13/239
  348/46
2015/0325004 A1* 11/2015 Utsunomiya .......... G06V 40/25
  382/103

(Continued)

FOREIGN PATENT DOCUMENTS

| CN | 105976397 A | 9/2016 |
| CN | 106127815 A | 11/2016 |
| CN | 109961034 A | 7/2019 |

OTHER PUBLICATIONS

Extended European Search Report dated Jan. 11, 2021 for European Patent Application No. 20182135.2.

(Continued)

*Primary Examiner* — Hadi Akhavannik
(74) *Attorney, Agent, or Firm* — Volpe Koenig

(57) ABSTRACT

A method of transfer learning an object recognition neural network comprises acquiring a set of image frames; determining, by a first object recognition algorithm implementing an object recognition neural network, a plurality of object recognitions in the set of image frames; determining verified object recognitions by evaluating the plurality of object recognitions by a second, different from the first, object recognition algorithm, wherein an object recognition with a positive outcome in said evaluating forms a verified object recognition; forming a training set of annotated images comprising image frames associated with the verified object recognitions; performing transfer learning of the object recognition neural network based on the training set of annotated images.

7 Claims, 2 Drawing Sheets

(51) Int. Cl.
  *G06T 7/70* (2017.01)
  *G06N 3/04* (2023.01)
  *G06N 3/08* (2023.01)
  *G06T 7/20* (2017.01)
  *G06F 18/214* (2023.01)
  *G06V 10/82* (2022.01)
  *G06V 10/44* (2022.01)
  *G06V 10/20* (2022.01)

(56) References Cited

U.S. PATENT DOCUMENTS

| | | |
|---|---|---|
| 2017/0286774 A1 | 10/2017 | Gaidon |
| 2018/0082129 A1* | 3/2018 | Yamaji ................. G06T 7/60 |
| 2018/0192035 A1* | 7/2018 | Dabeer ............... G06V 20/588 |
| 2019/0180144 A1* | 6/2019 | Tsishkou .............. G06V 20/52 |
| 2019/0304134 A1 | 10/2019 | Mauchly et al. |

OTHER PUBLICATIONS

Zafar et al., "Hands-On Convolutional Neural Networks with TensorFlow," Packt, chapter 7, pp. 195-197 (Jan. 1, 2018).

Michelucci, "Advanced Applied Deep Learning Convolutional Neural Networks and Object Detection," Chaper 4: Advanced CNNs and Transfer Learning, Apress, pp. 145-148 (Jan. 1, 2019).

Oquab et al., "Learning and Transferring Mid-level Image Representations Using Convolutional Neural Networks," 2014 IEEE Conference on Computer Vision and Pattern Recognition, 2014, pp. 1717-1724 (2014).

Jokhio et al., "Image Classification Using AlexNet With SVM Classifier and Transfer Learning". Journal of Information Communication Technologies and Robotic Applications, (Jun. 2019).

Mukhopadhyay et al., "FPGA Deployable Fire Detection Model for Real-Time Video Surveillance Systems Using Convolutional Neural Networks," 2019 Global Conference for Advancement in Technology (GCAT), pp. 1-7, (2019).

* cited by examiner

TRAINING OF AN OBJECT RECOGNITION NEURAL NETWORK

TECHNICAL FIELD

The present invention relates to the field of training of neural networks for object recognition. In particular, it relates to transfer learning of an object recognition neural network for use in an image capturing device.

BACKGROUND

Neural networks are today commonly used for a variety of image analytic tasks. One task is object recognition, including object detection, object localization, object pose estimation, and object segmentation. Neural networks for object recognition typically determine probabilities of having recognized a certain object. Object recognition candidates are then filtered to extract the object recognitions that have high probability, since these are most likely to be correctly identified. The values used to filter are often called thresholds. A lower threshold will result in more detections, including more false positives, and a higher threshold will result in fewer detections with a possible negative effect that actual objects are not detected. The neural network outputs object recognitions filtered based on the thresholds.

Training of a neural network for object recognition includes feeding the neural network with annotated images that depict objects and scenes of different appearances. In order to be a good fit for different object recognition applications, off-the-shelf neural networks are typically pre-trained with images that are chosen to cover a broad spectrum of environments and objects. A drawback with such training is that, when the neural network is setup to operate on images of a particular scene, the neural network is not adapted to that scene. Especially for surveillance applications, where object recognition plays an important role, it is desired to have a scene-specific training of the neural network.

To train neural networks for specific scenes from scratch would be a cumbersome solution. Moreover, it requires extensive work to collect images from a scene that covers all its variations, for example light variations, variations in vegetation (in outdoor scenes), or other variations in appearance due to weather or season. There is thus a need for finding a less complex solution for achieving a scene-specific training of an object recognition neural network.

SUMMARY

Achieving a method of providing a scene-specific training for an object recognition neural network should preferably be time-efficient, require low processing capacity, and be easy to implement.

Use of transfer learning with a smart generation of annotated images as training data, an adaption of a pre-trained neural network for object recognition to the specific installation may be achieved in an efficient and automatic manner. The smart generation of annotated images includes a multi-part object recognition with different recognition algorithms for filtering out images for a specific scene. These images are then annotated.

According to a first aspect, a method includes transfer of learning in an object recognition neural network. The method comprises the following acts:
acquiring a set of image frames,
determining, by a first object recognition algorithm implementing an object recognition neural network, a plurality of object recognitions in the set of image frames, wherein each object recognition comprises location data of a recognized object in an associated image frame,
determining verified object recognitions by evaluating the plurality of object recognitions by a second, different from the first, object recognition algorithm, wherein an object recognition with a positive outcome in said evaluating forms a verified object recognition,
forming a training set of annotated images comprising image frames associated with the verified object recognitions, and
performing transfer learning of the object recognition neural network based on the training set of annotated images.

Thus, the method includes a first object recognition with a first object recognition algorithm performed with a neural network, followed by a second object recognition by a second, different, object recognition algorithm. Images are sequentially filtered out from a set of images by the algorithms, annotated, and used for performing transfer learning of the neural network. From the start, the neural network typically has a general training for being able to handle a variety of environments and object appearances. By transfer learning with the training set of images that are filtered out in the proposed method, the neural network becomes better at detecting objects in the scene that it is monitoring. The method is intended to be performed with a set of images that represents a scene that is or is to be monitored by an image capturing device which utilizes the object recognition neural network. Preferably, the method is performed when the image capturing device is installed in its intended location.

The neural network outputs object recognitions that represent objects that have been recognized in images of the set of images. An object recognition comprises location data of a recognized object in an associated image frame. Thus, an object recognition comprises location data for the object and an association to the image frame in which the object has been recognized. The location data may be provided as metadata to the image frame, thereby forming an association between the location data and the image frame. By location data is meant position-indicating data in any form provided by any type of neural network for an object in an image frame. The location data may be provided in the form of image coordinates.

When forming a training set of annotated images based on the verified object recognitions and thereto associated image frames, an annotation process is applied such that the filtered images become annotated. Annotation processes, in general, are known and can be performed in various ways. For example, the filtered images may be annotated by manual review and annotation or by an annotation automation, both being conventional techniques within the field.

Transfer learning is also, as such, a well-known process for training a neural network. By transfer learning is meant that an already trained network is further trained with the purpose of changing the outcome, in this case adapting the object recognition mechanism in the neural network to the content of a specific scene. The architecture of the neural network remains the same. As an example, transfer learning may include changing some or all weights in a neural network. Transfer learning may alternatively be called further training or incremental training.

Non-limiting examples of object recognitions that are included herein are object localization, object detection, object segmentation, and pose estimation. Non-limiting examples of neural network architectures that may be used are: R-CNN, YOLO (You Only Look Once), SSD (single shot detector), Deeplab, U-Net, Mask R-CNN, PoseNet, OpenPose, DeepCut, and RMPE (Regional Multi-person Pose Estimation).

In a first embodiment, the second object recognition is performed based on a movement characteristic of the recognized object. By object movement characteristic is meant a quality of an object movement such as walking, running, waving for a human object, or driving for a vehicle object. The quality may relate to movement pattern, speed, or direction of the object movement.

To this end, the step of determining verified object recognitions may comprise determining if movement of correlated object recognitions between image frames fulfill a predetermined movement condition. The movement condition may be based on a movement pattern, movement direction, or speed of a recognized object. How to correlate object recognitions between image frames is, as such, known and may be done by use of, e.g., object embeddings.

A determined movement pattern of correlated object recognitions may be compared with one or more templates defining a movement pattern, wherein a similarity to the one or more templates above a certain threshold corresponds to fulfilling the predetermined movement condition.

A determined movement direction of correlated object recognitions may be compared with one or a range of template directions, wherein a sufficiently small distance to the one or the range of template directions corresponds to fulfilling the predetermined movement condition.

A determined speed value of correlated object recognitions may be compared with one or a range of template speed values, wherein a sufficiently small distance to the one or the range of template speed values corresponds to fulfilling the predetermined movement condition.

The variants disclosed above relating to different types of movement conditions may be combined such that the predetermined movement conditions is based on two or more types of movement characteristics.

In a variant of this embodiment, each object recognition comprises an object class which is utilized in the second object recognition algorithm for setting the predetermined movement condition. In particular, the predetermined movement condition is selected based on the object class and may be different for different object classes. With this approach of filtering images, a high degree of false positives from a first object recognition algorithm can be filtered out by the second object recognition algorithm in an efficient manner.

In a second embodiment, the second object recognition is performed based on a location of the recognized object. An object location is given by location data of an object recognition that is provided by the neural network. In determining verified object recognitions, that is performed by the second algorithm, it may be determined if the object recognition is located within a predetermined image area. Different image areas may exist for different object classes. Thus, the image area may be selected based on an object class that is provided by the first algorithm as a part of the object recognitions.

In one embodiment of the method, the neural network is configured such that an overdetection of objects is achieved. By overdetection is meant that the neural network detects objects that do not necessarily correspond to a real object in the scene. By this configuration, the first algorithm works as a first filter of the set of images which filters out true positive recognitions together with an amount of false positive recognition. The second algorithm aims at finding the true positive recognitions by filtering on a different parameter. As exemplified above, the different parameter may be selected based on information of the object recognition output from the first algorithm, for example object location or object class.

The first object recognition algorithm may be implemented in an image capturing device, such as a monitoring camera. This is a beneficial approach since a lot of images may need to be processed by the first object recognition algorithm to achieve a desired amount of object recognitions for the transfer training. If the first object recognition algorithm were performed on a remote server, the large number of images would need to be transmitted to the remote server for no reason since possibly most of them would not result in an object recognition. This is especially true for a scene with few appearances of relevant objects for the object detection model in use. Such a scene would require image acquisition over a long time before reaching the desired amount of object recognitions. Hence, both network capacity and time may be saved by performing the first object recognition algorithm in the image capturing device.

In addition, the second object recognition algorithm may be implemented in a remote server. Thus, the object recognitions may be determined in the image capturing device and transmitted to a remote server for analysis by the second object recognition algorithm. This configuration balances the benefits of keeping network utilization low with the benefits of not overloading the processing capacity of the image capturing device. Additionally, the second algorithm may be configured to include processing-demanding operations that are not possible to perform with the limited resources of an image capturing device.

In order to cover a variation in light conditions over a day cycle, the set of image frames may be acquired in a determined period, which may be at least 24 hours (i.e., a day cycle). Another condition that may be applied, alternatively or in addition, is that the image frames should be acquired until a predetermined number of object recognitions have been determined from the set of image frames.

According to one embodiment, the method comprises an additional act of transferring the object recognition neural network after transfer learning to another image capturing device that monitors the same scene or another scene of the same scene type.

According to a second aspect, a method of training an object recognition neural network in an image capturing device monitoring a scene comprises:
running an installation phase comprising performing the method of the first aspect, or embodiments thereof,
in an operation phase, monitoring an overall visual appearance of the scene by analyzing acquired image frames, and
upon detecting that the overall visual appearance has changed, running the installation phase again.

There is thus provided a running scheme for an image capturing device comprising two phases: installation phase and operation phase. In the installation phase, the set of images are acquired to determine object recognitions, as disclosed for the first aspect above. Moreover, according to the second aspect, there is provided a monitoring mechanism in the operation phase that is adapted to monitor an overall visual appearance of the scene. Upon detecting that the overall visual appearance of the scene has changed, the image capturing device enters the installation phase again to perform another round of transfer learning. By triggering the transfer learning when the visual appearance of the scene changes, the object detection neural network may be trained to handle different variations of the specific scene that is monitored. This makes the object recognition neural network even more adapted to the specific scene and it may perform even better.

According to a third aspect, a system comprises an image capturing device comprising a first object recognizer implementing an object recognition neural network and a remote server comprising a second object recognizer. The image capturing device is arranged to:

acquire a set of image frames, determine, by the first object recognizer, a plurality of object recognitions in the set of image frames, wherein each object recognition comprises coordinates of a recognized object in an associated image frame, and transmit the plurality of object recognitions and associated image frames to the remote server.

The remote server is arranged to:

determine verified object recognitions by evaluating the plurality of object recognitions by a second, different from the first, object recognition algorithm in the second object recognizer, wherein an object recognition with a positive outcome forms a verified object recognition, and form a training set of annotated images comprising image frames associated with the verified object recognitions.

In one embodiment, the remote server is further arranged to initiate transfer learning of the object recognition neural network based on the training set of annotated images.

As for variations and advantages of the third aspect, reference is made to the discussion of the first aspect above. These apply to this third aspect as well.

A further scope of applicability of the present teachings will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The embodiments will now be described in more detail by way of example and with reference to the accompanying schematic drawings, in which.

DETAILED DESCRIPTION

Figure 1:
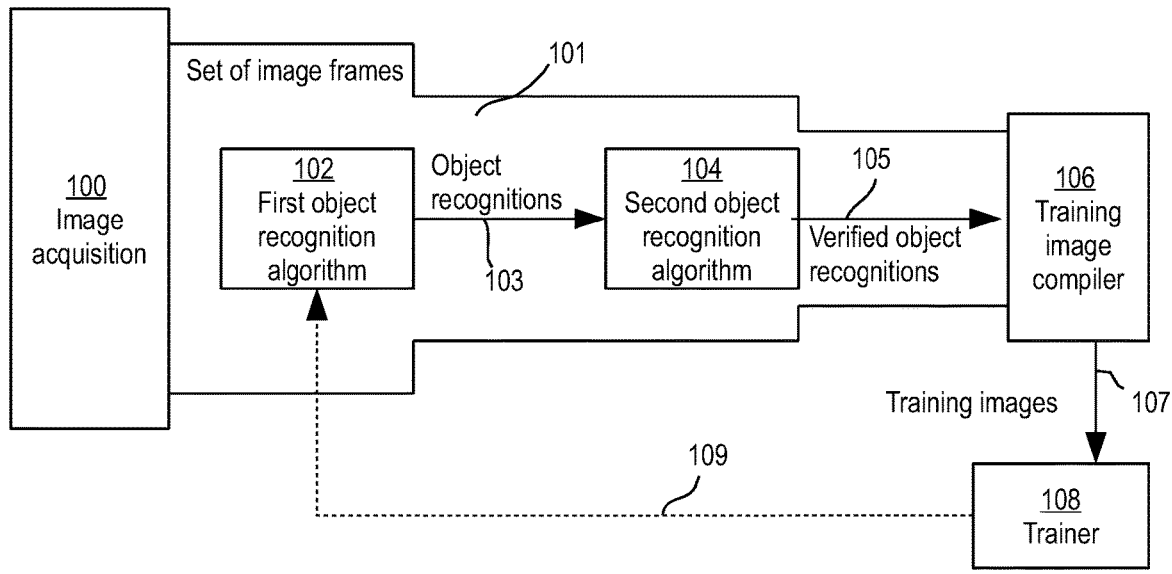
FIG. 1 is a general overview of a method of transfer learning according to an embodiment.

An embodiment of a transfer learning process for an object recognition neural network will now be disclosed. FIG. 1 provides an overview of the process. The process is performed by components illustrated in FIG. 1. Image frames are captured by image acquisition 100. In particular, a set of image frames 101 is acquired. The set of image frames 101 is then filtered in two steps by different object recognition algorithms. By filtered is meant that a selection is made in the set of images 101 based on a filtering criterion. The object recognition algorithms apply different filtering criteria. Thus, the set of image frames 101 is decreased by each filtering step, as indicated by the stepwise tapered shape of the set of image frames 101 in FIG. 1.

A first of the two steps is performed by a first object recognition algorithm 102 which implements an object recognition neural network. By implements is meant that the neural network is fed with the set of image frames 101 to perform object recognition. The first object recognition algorithm 102 may include pre-processing or post-processing to the object recognition by the neural network.

Non-limiting examples of object recognition types that are included herein are object localization, object detection, object segmentation, and pose estimation. Object localization includes determining an object position; object detection includes determining object position together with object class; object segmentation includes determining an object area; and pose estimation includes determining an object shape, for example how arms and legs of a person are positioned. How to perform any of these types of object recognitions by a neural network is well-known within the field. Details of the object recognition process will thus not be discussed more herein.

Depending on the network architecture that is used in the first object recognition algorithm 102, the output in the form of object recognitions 103 comes in different forms. The object recognitions 103 may for example comprise a bounding box representation, a keypoint vector, or coordinates of segments found by semantic segmentation.

Common for the output object recognitions 103 is that they comprise location data which represents, in some form, the location of one or more recognized objects for an associated image frame. The output object recognitions 103 may also comprise a determined object class per each recognized object.

The object recognitions 103 are input, together with a first subset of the set of image frames 101, to a second of the two steps which is performed by a second object recognition algorithm 104. The object recognitions 103, and associated image frames, are evaluated using a second selection criterion which may be based on a movement characteristic or an object location. The object recognitions that are evaluated with a positive outcome, i.e., that fulfil the second selection criterion, become verified object recognitions 105. Thus, the first subset of the set of image frames 101 is decreased again to a second, smaller than the first, subset of the set of image frames 101.

Going more into details of the second object recognition algorithm 104, there are different embodiments for this algorithm. Differences between the embodiments reside mainly in what selection criterion the object recognition in the evaluation is based on. Common for the embodiments is that a type of object recognition is performed to verify object recognitions 103.

In a first embodiment, the object recognition of the second object recognition algorithm 104 is performed based on a movement characteristic of the recognized object in the object recognition under evaluation. By object movement characteristic is meant a quality of an object movement such as walking, running, waving for a human object, or driving for a vehicle object. The quality may relate to movement pattern, speed, or direction of the object movement. For the purpose of determining verified object recognitions 105 based on an object movement characteristic, the second object recognition algorithm 104 may comprise determining if movement of correlated object recognitions between image frames fulfills a predetermined movement condition. The second object recognition algorithm 104 may thus consider several image frames for determining an object movement characteristic of an object recognition. The several image frames may be a consecutive image sequence and include the image frame of the object recognition that is analyzed by the second object recognition algorithm 104. The consecutive image sequence may include image frames before or after the image frame of the object recognition, or both before and after. In order to determine a movement characteristic, object recognitions of different image frames may need to be correlated. This may be done by for example object embeddings which is a conventional technique within the field. In other words, object embeddings may be used for determining which object recognitions in different images that correlate with each other.

The predetermined movement condition may be based on a movement pattern, movement direction, or speed.

As a first example, a determined movement pattern of correlated object recognitions may be compared with one or more templates defining a movement pattern, wherein a similarity to the one or more templates above a certain threshold corresponds to fulfilling the predetermined movement condition.

As a second example, a determined movement direction of correlated object recognitions may be compared with one or a range of template directions, wherein a sufficiently small distance to the one or the range of template directions corresponds to fulfilling the predetermined movement condition.

As a third example, a determined speed value of correlated object recognitions may be compared with one or a range of template speed values, wherein a sufficiently small distance to the one or the range of template speed values corresponds to fulfilling the predetermined movement condition.

The variants disclosed above relating to different types of movement conditions may be combined such that the predetermined movement conditions is based on two or more types of movement characteristics.

In a variant of this embodiment, each object recognition in the object recognitions 103 comprises an object class (determined by the object recognition neural network) which is utilized in the second object recognition algorithm 104 for setting the predetermined movement condition. In particular, the predetermined movement condition is selected based on the object class and may be different for different object classes. For example, if the object class is "person", the predetermined movement condition may be a movement pattern corresponding to a walking or running movement. Alternatively, the predetermined movement condition may be a speed corresponding to a walking or running speed. Further, for an object class "vehicle", the predetermined movement condition may be a movement pattern corresponding to a driving car or be a speed corresponding to a moving vehicle. This concept can be adapted to other object classes and types of movement conditions by a person skilled in the art. With this approach of filtering images, a high degree of false positives from a first object recognition algorithm can be filtered out by the second object recognition algorithm 104 in an efficient manner. This since only the objects moving according to a movement condition that is expected for its object class will be considered true positives. In this embodiment, the neural network can be set with low thresholds in the first object recognition algorithm 102 to capture all true positives together with a number of false positives, while the second object recognition algorithm 104 performs efficient second filtering based on the object class determined by the first object recognition algorithm 102.

In a second embodiment, the second object recognition of the second object recognition algorithm 104 is performed based on a location of the recognized object. An object location is given by location data of an object recognition that is provided by the object recognition neural network. The verified object recognitions 105 may be determined by determining that object recognitions are located within a predetermined image area. For example, the predetermined image area may be set as an image area corresponding to an area of the scene where moving objects are expected, or where objects of a specific type, that is interesting to train on, is expected to be found. The scene area could include a sidewalk, road, bicycle lane, entry/exit door, etc. The image area may be set manually beforehand, or be set in an automated manner by for example detecting areas including roads, doors, etc. Alternatively, the image area may be determined by analyzing previous image frames of the same scene to determine where object movement is present and setting the image area to those areas. Object movement of a particular interesting object class may be determined. The image area may be set based on the location of the determined object movement. Different image areas may exist for different object classes. Thus, in one embodiment, each object recognition of the object recognitions 103 may comprise an object class of the recognized object and the predetermined image area, utilized in the second object recognition algorithm 104, may be specific for the object class of the object recognition being evaluated. The shape, size, and location of the image area may be determined manually or in an automated manner.

Returning to the overview of FIG. 1, the verified object recognitions 105, together with their associated image frames, are input to a training set compiler 106. The training set compiler 106 forms a training set of annotated images 107 from the input. The annotation may be manually or automatically performed, both being well-established ways of annotating images. The annotated images 107 are input to a trainer 108, the purpose of which is to transfer train the first object recognition algorithm as indicated by 109. Transfer learning, as such, is a well-known technique for shaping or adjusting the training of a neural network. Details of the transfer learning will thus not be elaborated on herein.

By filtering out images using a plurality of different object recognition algorithms, the process becomes robust and less sensitive to the configurations of recognition sensitivity in the respective algorithm. Further, the process of transfer training also becomes more flexible in that the object recognition may be divided between different devices. The first object recognition algorithm 102 may be performed in one device, for example in an edge device (camera), and the second object recognition algorithm 104 may be performed in a remote device, e.g., a remote server. The process can thus take advantage of processing resources of both devices. This is a particular benefit for the transfer learning method in which it is important to gather images for the training set that cover preferably all kinds of objects that may be present in a scene. For this purpose, and according to an embodiment, the object detection neural network is configured such that an over detection of objects is achieved. By overdetection is meant that the neural network detects also objects that do not correspond to real objects in the scene, in addition to objects that do exist in the scene. The neural network thus identifies non-objects in the scene as moving objects. The object recognitions output from the neural network thus comprise both true positive recognitions and false positive recognitions. Overdetection of the neural network may be achieved by configuring it with low thresholds, which is a well-known configuration of object detection neural network of different types. By the second object recognition algorithm 104, verified object recognitions are determined which is a further limitation to true positive recognitions. The second object recognition algorithm 104 may be configured and fine-tuned in order to optimize its filtering. With the second object recognition algorithm 104 located on a remote server, there is no need for connecting to the edge device (camera) for configuring the first object recognition algorithm 102. In some implementations, it may be undesired or even not possible to make such a connection.

It is noted that FIG. 1 is not intended to illustrate any physical partition between the components. In other words, different components may be implemented in a single or different physical devices. An embodiment of an implementation will now be disclosed with reference to FIG. 2.

A digital camera 20 is monitoring a scene 21 by means of an image sensor 22, for example a conventional CMOS sensor. The scene 22 is typically an outdoor scene including environments and objects that define its appearance. In this example, the scene 21 includes a moving person 21a (as indicated by the trace of shadows) and a tree 21b. An image processor 23 of the camera 20 processes the captured images by different processing algorithms 23, including a recognizer 23a. Other non-limiting examples include white-balancer 23b, exposure controller 23c, and noise filter 23d.

The recognizer 23a performs a first object recognition algorithm, corresponding to the algorithm 102 of FIG. 1. That is, the recognizer 23a implements an object detection neural network to determine object recognitions in the captured images of the scene 21. These object recognitions may be associated with their image frames by including them as metadata to the image frames. The association may be kept through the subsequent encoding process that is performed by an encoder 24 of the camera 20.

Figure 2:
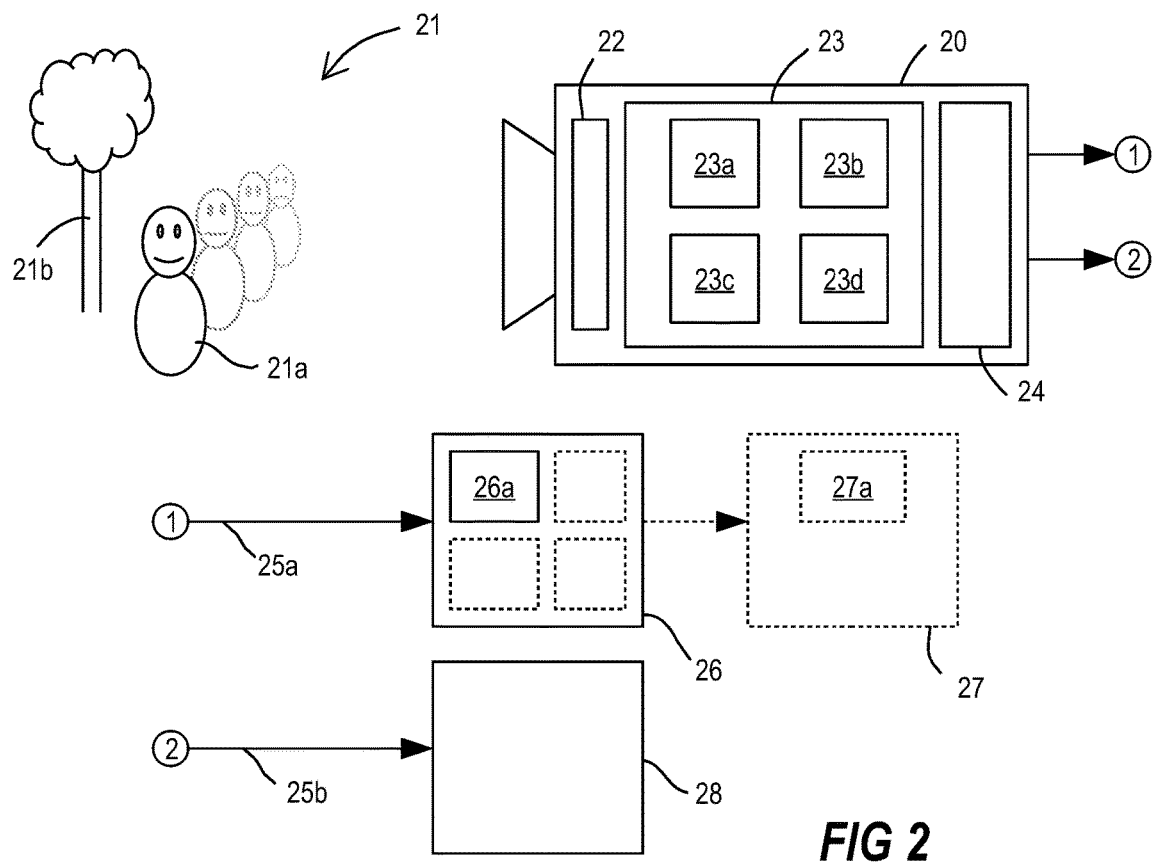
FIG. 2 illustrates a system with an image capturing device implementing a method according to an embodiment.

The camera 20 is adapted to operate in two different running modes having different output from the camera 20 as indicated by encircled numerals 1 and 2 in the FIG. 2. In a first running mode 1 the camera 20, in particular the encoder 20, outputs encoded image frames with object recognitions as indicated by 25a. The output is received by a server 26 that is located remotely from the camera 20. The server 26 comprises a processor 26a arranged to determine verified object recognitions by evaluating the received object recognitions and their associated image frames. The server 26 may comprise other processing components.

Verified object recognitions and their associated image frames are thereafter formed to a training set of annotated images. This step may be performed within the server 26, for example by another component thereof, or by a separate training device 27. The annotated images are used for transfer learning of the object recognition neural network implemented in the recognizer 23a. For this purpose, the server 26 or the trainer 27, may be adapted to connect to the recognizer 23a of the camera 20 by a wired or wireless connection.

In a second running mode 2 the camera 20 outputs encoded image frames as indicated by 25b to a remote device 28 being, e.g., a recorder or a streamer. The second running mode 2 represents a mode in which the camera 20 is operating as intended in use. That is, the camera 20 is capturing and transmitting images/video to a receiver for recording and/or live viewing. The object detection neural network may be active by determining object recognitions that may be used for internal image processing within the camera 20 and/or for external analysis, such as event analysis, in a separate device. The object recognitions may thus be transmitted with an image stream of the camera 20 in the second running mode 2. The object detection neural network is preferably configured with different thresholds in the different running modes. In particular, the object detection neural network is preferably set with low thresholds, to achieve overdetection as discussed, when the camera 20 is set in the first running mode 1. Further, the object detection neural network is preferably set with a higher threshold when the camera 20 is set in the second running mode 2. In this operational mode, the object detection neural network is to some degree tuned for the specific scene and should detect relevant object with high probability.

Figure 3:
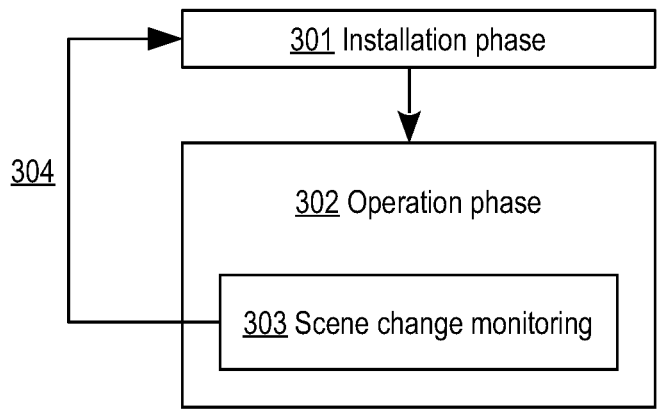
FIG. 3 illustrates a method with different running modes for an image capturing device according to an embodiment.

The concept of two running modes is further illustrated in FIG. 3 which illustrates a method of shifting between the different running modes. In an installation phase 301, the camera 20 works in a first running mode 1 of FIG. 2. That is, object recognitions are determined within the camera and sent to the server 26 for evaluation, wherein verified object detections are determined. In order to cover a variation in light conditions over a day cycle, the set of image frames may be acquired in a determined period, which may be at least 24 hours (i.e., a day cycle). Another condition that may be applied is that the image frames should be acquired until a predetermined number of object recognitions have been determined from the set of image frames. The image frames may be continuously evaluated by the object recognition neural network, and upon reaching the predetermined number of object recognitions, the image acquisition may be ended and the analysis of the object recognitions by the second object recognition algorithm may be initiated. The predetermined number of object recognitions is preferably 1000 or more. The number of needed object recognitions may depend on the type and size of the object detection neural network.

Upon finalizing the transfer learning of the object recognition neural network in the installation phase 301, the camera 20 enters the operation phase 302.

Besides the normal function of image acquisition of the camera 20 in the operation phase 302, there is provided a monitoring mechanism. The purpose of the monitoring mechanism is to monitor an overall visual appearance of the scene 21. The monitoring of the overall visual appearance may be performed via image analysis or via measurement by sensors (not illustrated), such as a light sensor. The monitoring mechanism may be performed by use of a component of the image processor 23. Upon detecting that the overall visual appearance of the scene has changed, the camera 20 enters the installation phase 301 again, as indicated by 304, to perform another round of transfer learning. By triggering the transfer learning when the visual appearance of the scene changes, the object detection neural network of the first object recognition algorithm 102 may be trained to handle different variations of the specific scene 21 that is monitored.

Causes to overall visual scene appearance changes include weather and season. For example, vegetation in an outdoor scene may be very different during the summer and during the winter, especially in regions where season changes are big. The amount and type of objects in motion in a scene may also differ depending on season. For example, a marina is typically full of boats and people movement during the summer season but may be quite still during the rest of the year. It is thus an advantage to train the object recognition neural network with images from both periods to be able to perform well all year around. The same reasoning applies to weather shifts where movement in a scene and its appearance may differ in different weather conditions, for example snow, rain, or sun. In an indoor scene, reorganization of furnishings may change the scene to such an extent that further training is needed.

As discussed, a purpose of the transfer learning of the object recognition neural network is to adapt the configuration of the neural network so that it performs well on the images it processes. Other cameras with object recognition neural networks which monitor a similar or even the same scene may benefit from the transfer learning as well. Even though the scene might not be exactly the same, but the same scene type, the transfer learning may be an improvement for a standard image trained neural network. For this purpose, and according to one embodiment, the object recognition neural network of the camera 20 may be transferred to a further camera after transfer learning. By transferring the object recognition neural network is meant arranging a copy of the neural network for implementation in the other image capturing device. Alternatively, or in addition, the network may be transferred to a storage device (for example on a cloud server) to become a resource for future cameras set to monitor the same scene or scene type. By same scene type is herein meant that the scenes have similarities with respect to environment (outdoor/indoor), content (detected object classes), or geographical location.

Figure 4:
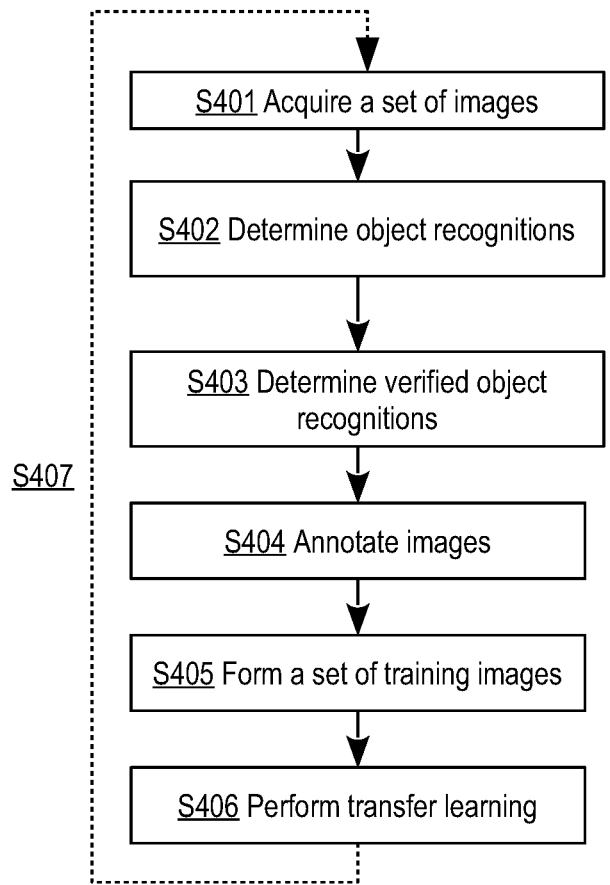
FIG. 4 illustrates a method according to an embodiment.

An overview of the method steps for transfer learning according to the embodiments discussed herein is provided in FIG. 4. To begin with, a set of images is acquired S401. From this set of images, object recognitions are determined S402, thus filtering out image frames including object recognitions as detected by an object recognition neural network. In a preceding step S402, verified object recognitions are determined from the object recognitions of step S402. Thus, a second image filtering is performed. The image frames that are associated with the verified object recognitions are annotated in step S404. Thereafter, a training set of annotated images is formed in step S405. Transfer learning of the object recognition neural network is then performed with the annotated images. The method steps S401-S406 may be performed in an installation phase for a camera, as discussed above. The method steps S401-S406 may be triggered to be performed again based on a condition, such as that an overall scene appearance of a monitored scene changes as exemplified above. An iteration step S407 is thus included, wherein the iteration step S407 may be triggered. Alternatively, the iteration step S407 may be configured to be performed on a regular basis, for example every $3^{rd}$ month or once a year. As yet an alternative, the iteration step S407 may be manually triggered by an operator. The trigger mechanisms may of course also be combined in a single embodiment.

It is to be understood that the illustrated and disclosed components in FIGS. 1 and 2 may be implemented as hardware, software, or a combination thereof.

In a hardware implementation of a component, the component may correspond to circuitry which is dedicated and specifically designed to provide functionality of the part. The circuitry may be in the form of one or more integrated circuits, such as one or more application specific integrated circuits or one or more field-programmable gate arrays.

In a software implementation of a component, the circuitry may instead be in the form of a processor, such as a microprocessor, which in association with computer code instructions stored on a (non-transitory) computer-readable medium, such as a non-volatile memory, causes the image processor 23 to carry out (part of) any method disclosed herein. Examples of non-volatile memory include read-only memory, flash memory, ferroelectric RAM, magnetic computer storage devices, optical discs, and the like. For example, in a software case, the recognizer 23a may correspond to a portion of computer code instructions stored on the computer-readable medium, that, when executed by the processor, causes the image processor 23 to carry out the functionality of the component.

The person skilled in the art realizes that the present teachings by no means are limited to the preferred embodiments described above. On the contrary, many modifications and variations are possible within the scope of the appended claims. For example, the disclosed concept of transfer training can be applied in cameras based on different types of imaging techniques, for example thermal cameras. It is also noted that the second recognition algorithm may be performed on recorded object recognitions (e.g., being a part of a recorded video stream) or be performed on object recognitions that are live streamed from a camera. In the first variant, the recorded object recognitions, together with associated image frames, may be stored on a storage device such as a server. Referring to FIG. 2, the storage device may be located between the camera 20 and the server 26.

The invention claimed is:

1. A computer-implemented method of providing a scene-specific training for a pretrained object recognition neural network, the method comprising acquiring, by an image sensor of a digital camera, a set of image frames of a scene to be monitored by the digital camera, performing, by means of a first object recognition algorithm, a first image filtering step on the set of image frames to filter out a first subset of the set of image frames, wherein the first subset comprises image frames associated with object recognitions as determined by the first object recognition algorithm (102), and wherein each object recognition comprises location data and an object class of a recognized object in an associated image frame, performing, by means of a second object recognition algorithm, a second image filtering step on the first subset of image frames to decrease the first subset of the set of image frames to a second subset of the set of image frames, wherein the second subset of the set of image frames comprises image frames associated with verified object detections as determined by the second object recognition algorithm by evaluating the object recognitions in the first subset of image frames to determine if movement of correlated object recognitions between image frames fulfills a predetermined movement condition that is specific for the object class of the object recognition being evaluated, and wherein an object recognition with a positive outcome in said evaluating forms a verified object recognition, forming a training set of annotated images frames from the verified object recognitions and their associated image frames, and providing scene-specific training of the pretrained object recognition neural network based on the training set of annotated image frames.

2. The method according to claim 1, wherein the first object recognition algorithm is implemented in an image capturing device.

3. The method according to claim 2, wherein the second object recognition algorithm is implemented in a remote server.

4. A computer-implemented method of providing a scene-specific training for a pre-trained object recognition neural network in an image capturing device monitoring a scene, the method comprising running an installation phase comprising performing the method of claim 1, in an operation phase, monitoring an overall visual appearance of the scene by analyzing acquired image frames, and upon detecting that the overall visual appearance has changed, running the installation phase again.

5. The method according to claim 4, wherein the overall visual appearance is a light condition or a visual appearance due to weather or season.

6. A system comprising a digital camera comprising a first object recognizer and a remote server comprising a second object recognizer, wherein the image capturing device is arranged to acquire, by an image sensor of the digital camera, a set of image frames of a scene to be monitored by the digital camera, determine, by the first object recognizer, a plurality of object recognitions in the set of image frames by performing, by means of a first object recognition algorithm, a first image filtering step on the set of image frames to filter out a first subset of the set of image frames, wherein the first subset comprises image frames associated with object recognitions as determined by the first object recognition algorithm, wherein each object recognition comprises location data and an object class of a recognized object in an associated image frame, and transmit the plurality of object recognitions and associated image frames to the remote server, and wherein the remote server is arranged to determine verified object recognitions by performing, by means of a second object recognition algorithm of the second object recognizer, a second image filtering step on the first subset of image frames to decrease the first subset of the set of image frames to a second subset of the image frames, wherein the second subset of the set of image frames comprises image frames associated with verified object recognitions as determined by the second object recognition algorithm by evaluating the object recognitions in the first subset of image frames to determine if movement of correlated object recognitions between image frames fulfills a predetermined movement condition that is specific for the object class of the object recognition being evaluated, and wherein an object recognition with a positive outcome in said evaluating forms a verified object recognition, and form a training set of annotated images comprising image frames associated with the verified object recognitions.

7. The system according to claim 6, wherein the remote server is further arranged to initiate scene-specific training of a pretrained object recognition neural network based on the training set of annotated images.

* * * * *